United States Patent
Hirokawa (10) Patent No.: US 7,471,952 B2
(45) Date of Patent: Dec. 30, 2008

(54) DATA TERMINAL DEVICE

(75) Inventor: Yohei Hirokawa, Tokyo (JP)

(73) Assignee: NEC Corporation, Tokyo (JP)

(*) Notice: Subject to any disclaimer, the term of this patent is extended or adjusted under 35 U.S.C. 154(b) by 1063 days.

(21) Appl. No.: 10/603,789

(22) Filed: Jun. 26, 2003

(65) Prior Publication Data
US 2004/0002303 A1    Jan. 1, 2004

(30) Foreign Application Priority Data
Jul. 1, 2002    (JP) ............................ 2002-192580

(51) Int. Cl.
*H04Q 7/20* (2006.01)
(52) U.S. Cl. .................. 455/452.2; 701/220; 701/221; 701/222; 701/223; 701/224; 701/225
(58) Field of Classification Search ............ 455/452.2; 701/220–225
See application file for complete search history.

(56) References Cited

U.S. PATENT DOCUMENTS

| | | | |
|---|---|---|---|
| 6,321,158 B1 | 11/2001 | DeLorme et al. | |
| 6,324,467 B1* | 11/2001 | Machii et al. | ............... 701/200 |
| 6,334,090 B1 | 12/2001 | Fujii | |
| 6,836,728 B2* | 12/2004 | Shimabara | .................. 701/212 |
| 6,853,911 B1* | 2/2005 | Sakarya | ....................... 701/208 |
| 7,305,212 B2* | 12/2007 | Spratt | ........................ 455/41.2 |

FOREIGN PATENT DOCUMENTS

| | | |
|---|---|---|
| DE | 199 35 718 A1 | 2/2001 |
| DE | 199 335 718 A1 | 2/2001 |
| GB | 2352128 A | 2/2001 |
| GB | 2 377 133 A | 12/2002 |
| JP | 11-064032 A | 3/1999 |
| JP | 11-295096 A | 10/1999 |
| JP | 2002-005670 A | 1/2002 |

OTHER PUBLICATIONS

European Search Report issued Dec. 23, 2003.

* cited by examiner

*Primary Examiner*—Quynh H Nguyen
(74) *Attorney, Agent, or Firm*—Dickstein, Shapiro, LLP.

(57) ABSTRACT

A position data receiving part receives position data transmitted from an artificial satellite. A wireless unit transmits and receives data with respect to a base station. A detailed map data memory part stores detailed map data received by the wireless part. Scale determining part determines the scale of the road map according to a plurality of position data received a plurality of times by the position data receiving part. A display part displays the road map of the scale determined by the scale determining part and detailed map data stored in the memory part.

18 Claims, 13 Drawing Sheets

MOVABLE RANGE

PRESENT POSITION

DATA TERMINAL DEVICE

BACKGROUND OF THE INVENTION

This application claims benefit of Japanese Patent Application No. 2002-192580 filed on Jul. 1, 2002, the contents of which are incorporated by the reference.

The present invention relates to data terminal devices for displaying road map based on position data transmitted from an artificial satellite.

Portable telephone set is well known in the art, which can display a map on a display unit such as a liquid display panel.

In the prior art portable telephone set, however, such map is displayed on the entire screen of the display unit. This means that even data in an unnecessary range is displayed, thus making it difficult to recognize necessary data. Also, in the prior art portable telephone set, the sole road map is displayed, no data for walking people, such as crossroads and walking road bridges, is displayed. This means that when it is desired to guide a walking person with a map such as the car navigation, it has been impossible to adequately guide the walking person because of no display of data for walking people such as crossroads and walking road bridges.

SUMMARY OF THE INVENTION

An object of the present invention is to provide a data terminal device such as a portable telephone set, which can display adequate map data without need of any large capacity memory.

According to an aspect of the present invention, there is provided a data terminal device comprising: a position data receiving part for receiving position data transmitted from an artificial satellite; a wireless unit for transmitting and receiving data with respect to a base station; a detailed map data memory part for storing detailed map data received by the wireless part; scale determining part for determining the scale of the road map according to a plurality of position data received a plurality of times by the position data receiving part; and a display part for displaying the road map of the scale determined by the scale determining part and detailed map data stored in the memory part.

The data terminal device further comprises a road map storing part for storing the road map in a plurality of different scales, and in which the road map displayed on the display part is read out from the road map storing part.

In the data terminal device, road map data for displaying the road map is stored in the road map server connected to a network with the base station connected thereto, the wireless part receives, via the base station, the road map data stored in the road map server, and the road map is displayed based on the road map data received by the wireless part.

In the data terminal device, the scale determining part predicts a moving range capable of being covered in a predetermined time based on the position data received a plurality of times by the receiving part, the map scale being determined according to the predicted moving range capable of being covered.

In the data terminal device, the scale determining part computes the moving speed based on the position data received a plurality of times by the receiving part, the moving range capable of being covered being predicted according to the computed moving speed.

In the data terminal device, the scale determining part predicts, as the movable range capable of being covered, a range which can be covered up to next acquisition of position data or determination based on the obtained position data, by using the computed moving speed.

In the data terminal device, the wireless part receives only detailed map data of a necessary area based on the movable range capable of being covered as predicted by the scale determining part.

In the data terminal device, the map of the scale determined by the scale determining part and the detailed map data stored in the memory part are displayed in superimposition on the each other on the display part.

The detailed terminal device further comprises a moving direction determining part for determining the moving direction based on the position data received a plurality of times by the wireless part, and in which the wireless part receives detailed map data only with respect to the moving direction determined by the moving direction determining part.

The data terminal unit further comprises a route determining part for executing route guide display by determining the route from the present position to a desired spot, and in which the wireless part receives detailed map data only in the neighborhood of the route determined by the path determining part.

In the data terminal device, the detailed map data are stored in a detailed map data server connected to a network with the base station connected thereto; and the wireless part receives, via the base station, detailed map data stored in the detailed map data server.

Other objects and features will be clarified from the following description with reference to attached drawings.

PREFERRED EMBODIMENTS OF THE INVENTION

Preferred embodiments of the present invention will now be described with reference to the drawings.

A first embodiment of the data terminal device according to the present invention will now be described with reference to FIGS. 1 to 9. The first embodiment of the data terminal device is an application of the present invention to a portable telephone set, which is carried by a walking person as user.

Figure 1:
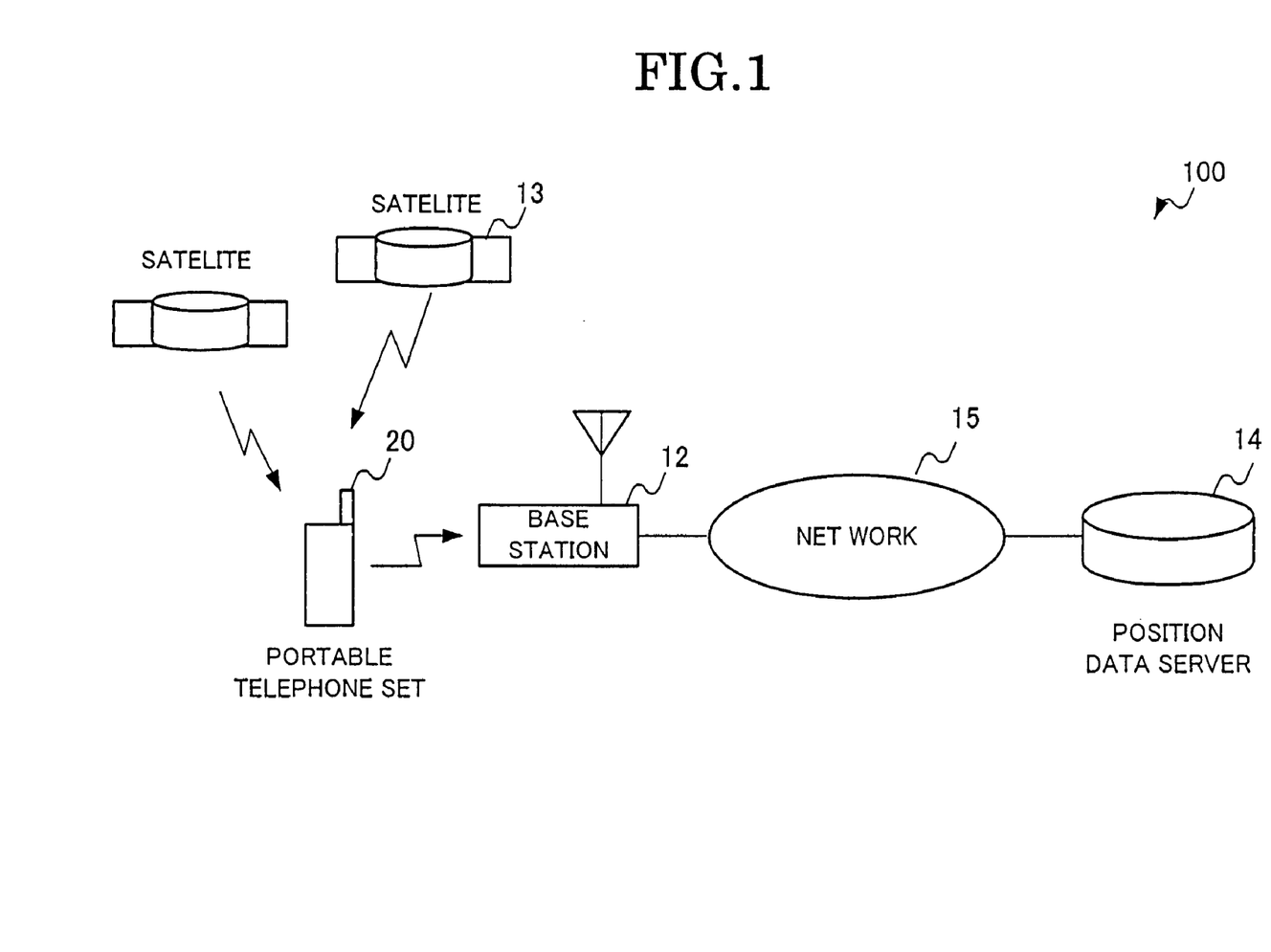
FIG. 1 shows a data network system using a first embodiment of the data terminal device according to the present invention.

FIG. 1 shows a data network system, which uses the first embodiment of the data terminal device. As shown in FIG. 1, the data network system 100 comprises a portable telephone set 20 as data terminal device, a base station 12 accessible by the portable telephone set 20, an artificial satellite 13 for transmitting GPS (global positioning system) radio waves, and a position data server 14 for storing detailed map data such as map data for walking people, e.g., crossroads, walking road bridges and underground roads. As shown in FIG. 1, the base station 12 and the position data server 14 are interconnected via a network 15 (such as an internet system).

In the position data server 14, detailed map data corresponding to scales of maps capable of being displayed in the portable telephone set 20 and, as will be described hereinunder, it is possible to transmit necessary detailed map data in correspondence to a request from the portable telephone set 20. For example, as data corresponding to the greater scale maps, detailed map data in the greater details are prepared.

Figure 2:
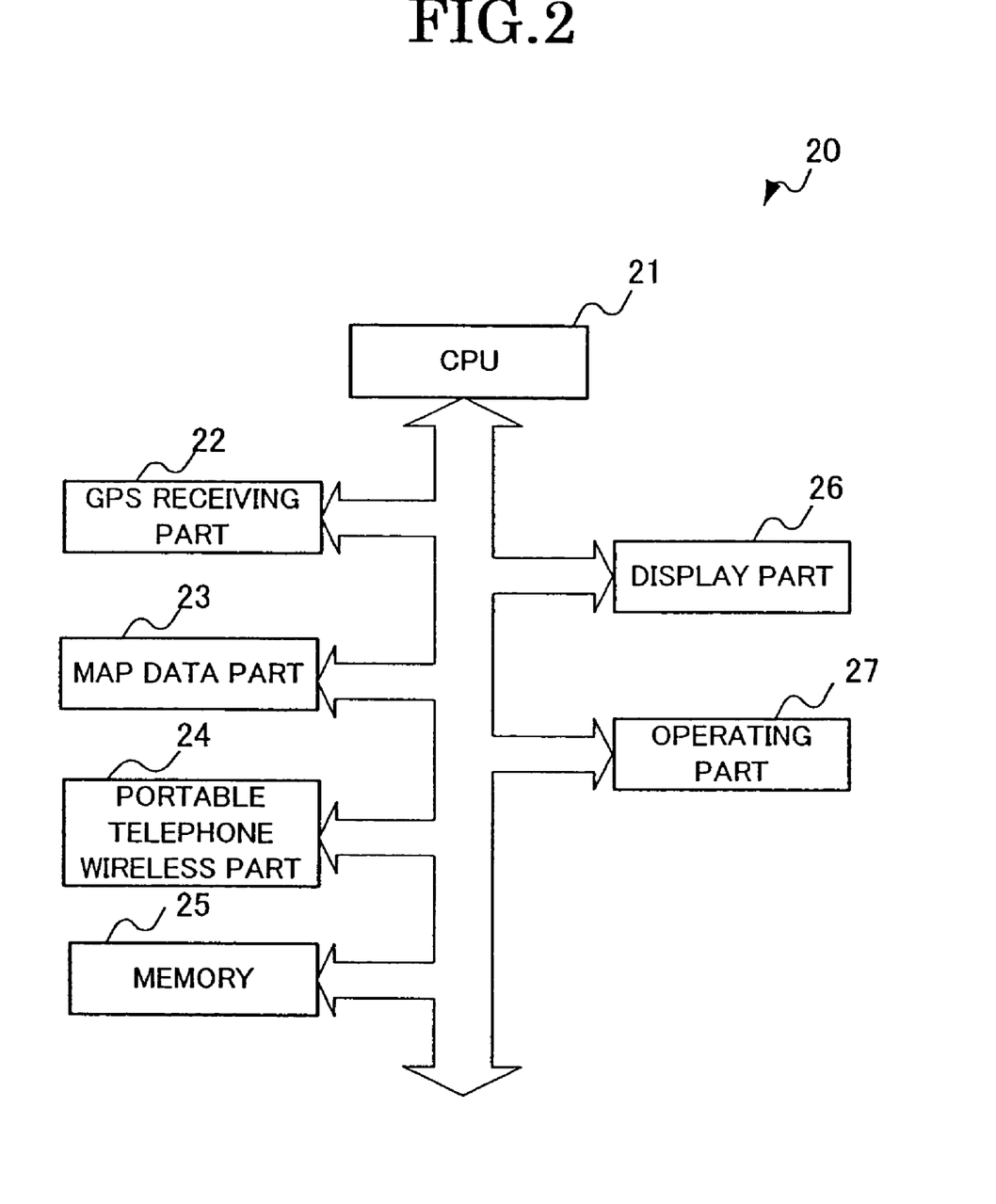
FIG. 2 is a block diagram showing the arrangement of the portable telephone set according to the present invention.

FIG. 2 is a block diagram showing the arrangement of the portable telephone set 20. As shown in the Figure, the portable telephone set 20 includes a CPU 21 for controlling the operations of various parts of the portable telephone set 20, a GPS receiving part 22 for receiving GPS radio waves from the artificial satellite 13, a map data part 23 for storing road map data to be used for road map display, a portable telephone wireless part 24 for executing transmission and reception of data with respect to the base station 12, a memory 25 for progressively storing positions of the portable telephone set 20 and also storing the received detailed map data, a display part 26 constituted by a liquid crystal display unit or the like for displaying road map and detailed map data, and an operating part 27 for accepting user's operations.

The GPS receiving part 22 repeatedly receives the data transmitted as GPS radio waves from the artificial satellite 13. In the CPU 21, the present position is determined by computing the longitude and latitude based on the data received in the GPS receiving part 22, and the determined present position data is stored in the memory 25. As the GPS in the portable telephone set 20 may be adopted either network assist type or stand-alone type.

Figure 3:
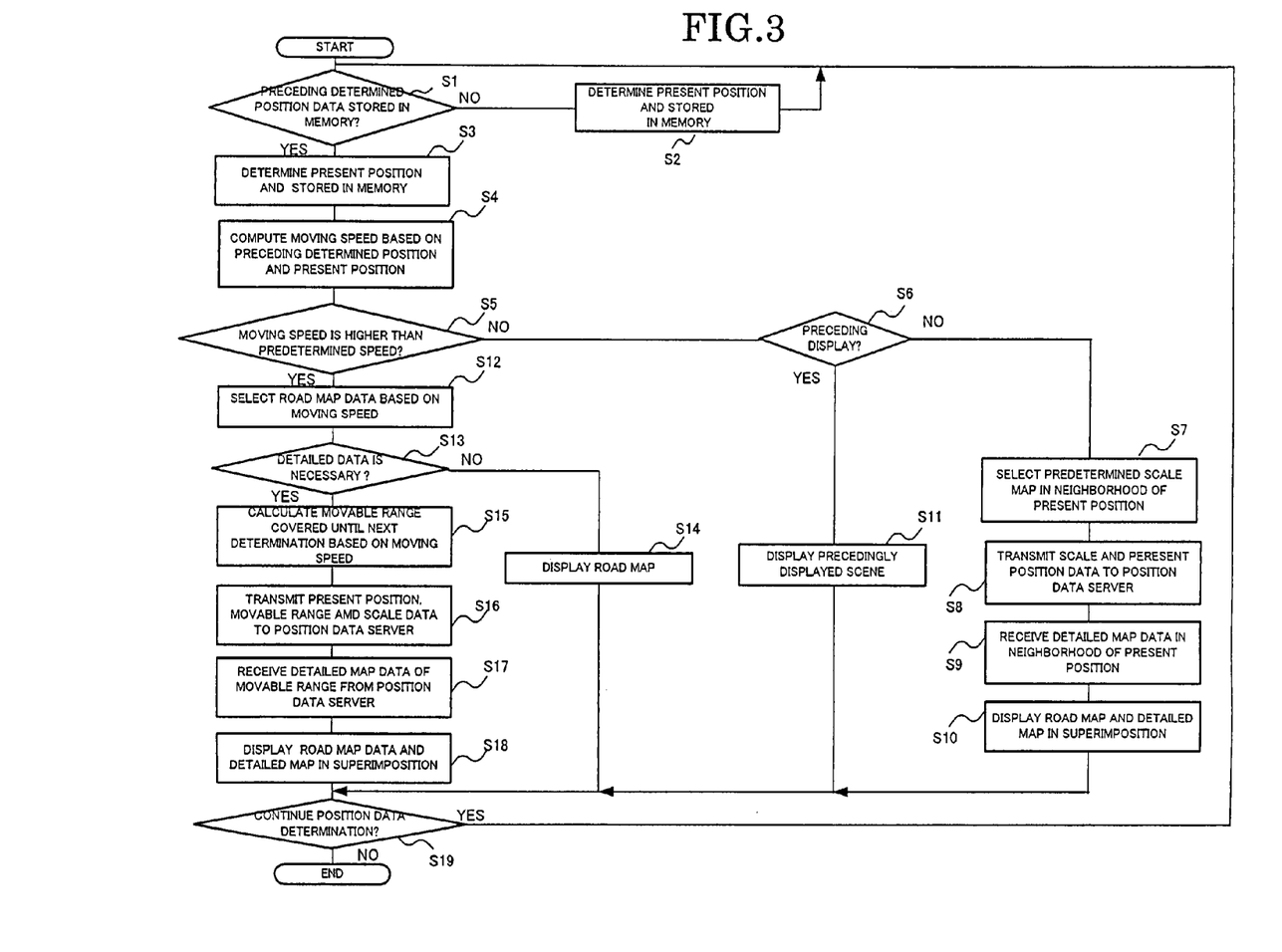
FIG. 3 is a flow chart illustrating the operation of the portable telephone set according to the present invention.
Figure 4:
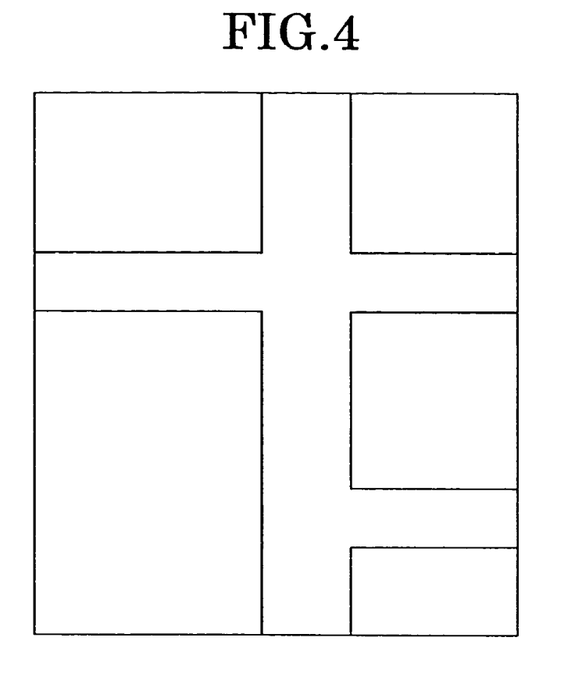
FIG. 4 is a view showing a road map.
Figure 5:
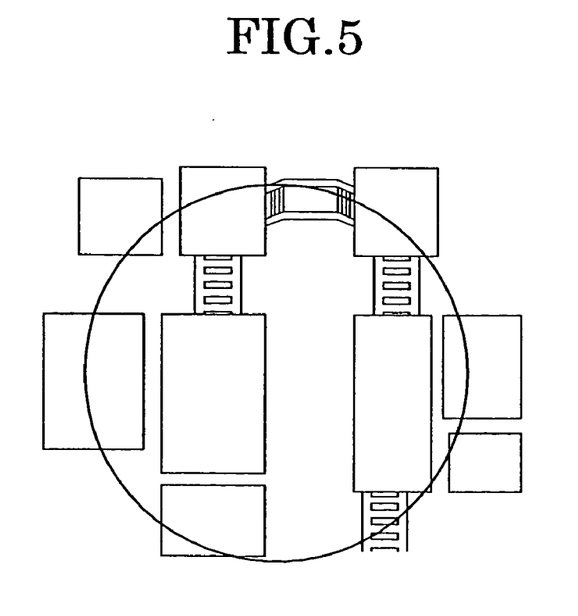
FIG. 5 is a view showing detailed map.
Figure 6:
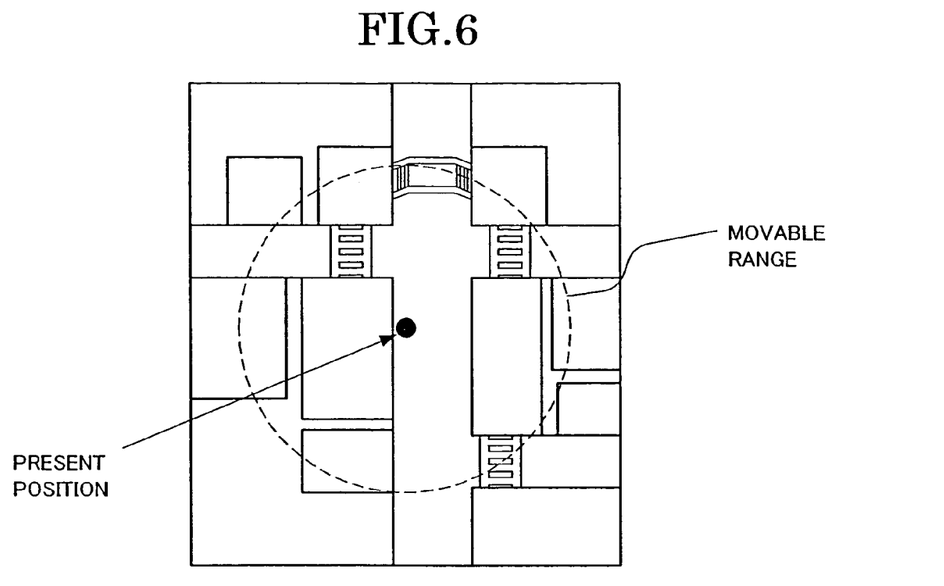
FIG. 6 is a view showing a map displayed on the display part.

The operation of the portable telephone set 20 will now be described with reference to FIGS. 3 to 6. FIG. 3 is a flow chart illustrating the operation of the portable telephone set 20. FIG. 4 is a view showing a road map. FIG. 5 is a view showing detailed map. FIG. 6 is a view showing a map displayed on the display part.

The routine shown in the flow chart of FIG. 3 is executed under control of the CPU 21.

In step S1 shown in FIG. 3, a check is made as to whether position data obtained by the preceding determination time has been stored in the memory 25. When it is decided that no position data is present in the memory 25, the GPS receiving part 22 receives GPS radio waves from the artificial satellite 13 for the present position determination and the determined present position data is stored in the memory 25 (step S2). The routine then goes back to the step S1. When it is decided that the position data is present in the memory 25, the GPS receiving part 22 receives GPS radio waves for present position detection and the determined present position data is stored in the memory 25 (step S3). The routine then goes to the step S4. At this time, the preceding and present determined present position data are stored in the memory 25. The present position determination in the step S3 is executed at a timing to provide a constant time interval with respect to the preceding present position determination.

In the step S4, the movable distance covered is computed based on the preceding and present position data stored in the memory 25. Also, the moving speed (i.e., average moving speed) from the preceding determination instant till the present determination instant, is computed based on the computed movable distance and the time interval from the preceding determination instant till the present determination instant. Then, a check is made as to whether the computed moving speed is higher or not lower than a predetermined speed (step S5). The predetermined speed is set to one, which permits a check in the step S5 as to whether no substantial movement has been made from the position of the preceding determination till the present position of the present determination, for instance, it is set to about 1 km/h or below.

When it is determined in the step S5 that the moving speed is lower than the predetermined speed, that is, when it is determined that no substantial movement has been made, a check is made as to whether the map display has been executed at the preceding present position determination time (step S6). When negation yields in this check, the routine goes to a step S7. When affirmation yields, the routine goes to a step S11. In the step S7, a predetermined scale road map in the neighborhood of the present position is selected, and data representing the map scale and the present position are transmitted to the position data server 14 (step S8). When the position data server 14, responsive to this data, transmits the corresponding detailed map data to the portable telephone set 20. In the position data server 14, which has thus received the detailed map data in the neighborhood of the present position transmitted from the position data server 14 (step S9), causes the road map selected in the step S7 and the detailed map based on the detailed map data obtained in the step S9 are displayed in superimposition on each other on the display part 26 (step S10). The routine then goes to the step S19. When affirmation yields in the check of the step S6, the routine goes to the step S11, in which the map displayed at the preceding present position determination time is continually displayed, and the routine then goes to the step S19.

When it is determined in the step S5 that the moving speed is higher than the predetermined speed, a map of an adequate scale is selected among the map data stored in the map data part 23 based on the moving speed computed in the step S4 (step S12). Then, the user is instructed to input data as to whether detailed map data is necessary, and when it is determined detailed map data has been requested by operation with respect to the operating part 27, the routine goes to a step S15. When it is determined that no detailed map data has been requested, the routine goes to a step S14 (step S13). The user can make a selection as to whether such detailed map is to be displayed.

When no detailed map is necessary, as shown in FIG. 4, only the road map selected in the step S12 is displayed on the display part 26 (step S14). The routine then goes to a step S19.

When the detailed map is necessary, the distance which can be covered until the next present position determination is calculated (step S15). This calculation is executed based on the moving speed computed in the step S4. Since the present position determination interval (i.e., time interval) is constant, the distance or range that can be covered can be calculated from the computed moving speed. Then to the position data server 14 the data of the present position, the range of movement that can be covered until the next present position determination and the scale of road map to be displayed on the display part 26 are transmitted (step S16). Next, the detailed map data transmitted from the position server 14 is received and stored in the memory 25 (step S17). The detailed map data is identical with the data transmitted in the step S16 and, as shown in FIG. 5, represents a detailed map in the covered movement range conforming to the road map scale. Subsequently, by using detailed map data read out from the memory 25, a detailed map as shown in FIG. 4 is overlapped over the road map selected in the step S12, and a map as shown in FIG. 6 is displayed on the display part 26 (step S18). At this time, it is possible, for instance, to display the map such that the present position is located at the center of the display screen of the display part 26 for recognition by the user.

Subsequently, the user is instructed to input data as to whether the operation for obtaining the position data is to be continued, and when it is determined on the basis of operation with respect to the operating part 27 that continuation has been requested, the routine goes back to the step S1. When it is determined that no continuation has been requested, an end is brought to the routine (step S19). As shown, the user can make a selection as to whether a detailed map is to be displayed, and when movement is to be continued, the position data is repeatedly obtained according to the user's will. When the routine has returned to the step S1, the next present position determination is executed by keeping the constant present position determination interval (step S3).

Figure 7:
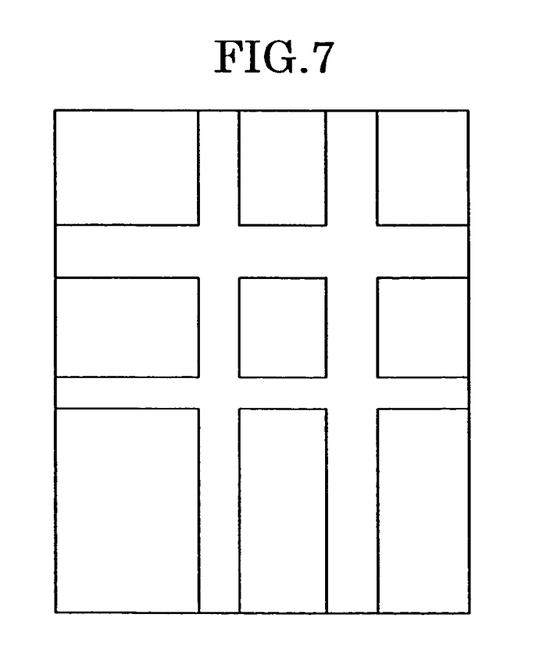
FIG. 7 shows a road map displayed during high speed movement.
Figure 8:
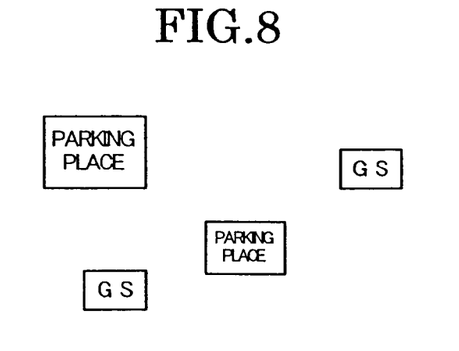
FIG. 8 shows a detailed map displayed during the high speed movement.
Figure 9:
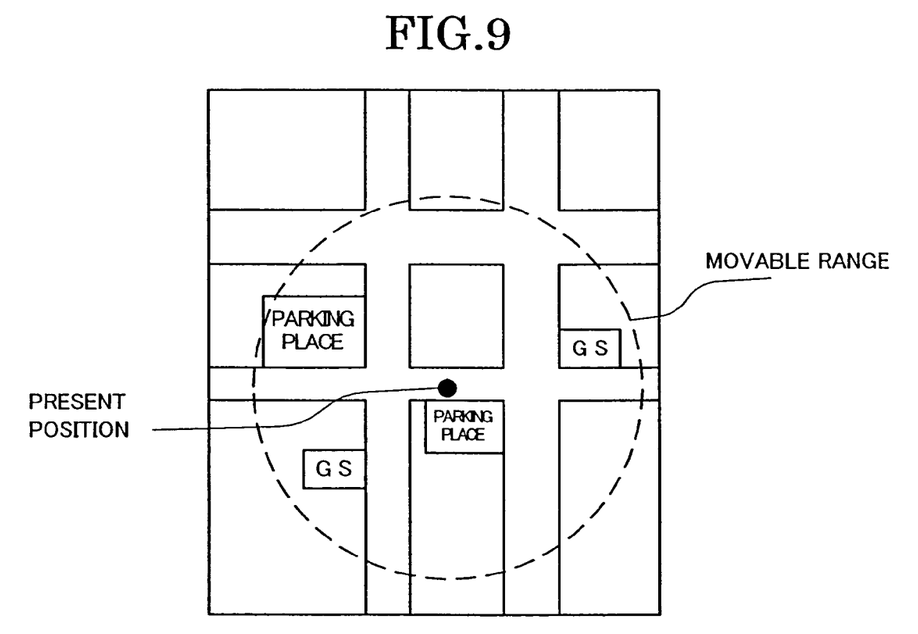
FIG. 9 shows a map displayed during the high speed movement.

FIG. 6 shows an example of display to be carried by a walking person. When displaying the map during high speed movement such as movement on vehicle, the scale of the road map and the contents of detailed map data can be changed according to circumstances. FIG. 7 shows a road map which is displayed during high speed movement, FIG. 8 shows a detailed map shown during the high speed movement, and FIG. 9 shows a map displayed during the high speed movement. As shown in FIGS. 8 and 9, in this example parking places and gasoline stands (labeled GS) are shown in superimposition on the road map. Also, the map scale is reduced to match the moving range capable of being covered.

As shown above, in the first embodiment the moving distance capable of being covered is computed according to the moving speed of the data terminal device user, and detailed map data only in the necessary range is received according to the computed moving distance capable of being covered. Thus, it is possible to reduce the quantity of the received data and also reduce time necessary for the data reception. Also, since the road map and the detailed map data are dealt with separately, when no detailed map data is necessary, it is possible to reduce data as the subject of display, thus permitting ready recognition of the map data in a data terminal device having a small display screen. Furthermore, since it is possible to display map data on the display screen according to the moving speed, it is possible to display the detailed data for walking people, such as walking road bridges, crossroads and underground roads, which are not displayed in the ordinary map.

Furthermore, since the detailed map data are obtained from the position data server, it is possible to obtain, as newest data, shop data or the like which are subject to frequent changes compared to road data. For this reason, unlike the case of storing detailed map data or the like in the memory, it is not necessary to frequently update the memory contents, and only the road map which need not be frequently updated may be updated. Still further, the detailed map data can be maintained uni-dimensionally on the position data server side.

In the above way, in the first embodiment it is possible to present adequate data to, for instance, a walking person. Also, since no detailed map data is stored in the data terminal device, the data terminal device requires no large capacity memory. Besides, since the detailed map data is limited to a necessary range, it is possible to reduce time required for obtaining the detailed map data.

In the first embodiment, the moving range capable of being covered is computed according to the moving speed for the map display in this range. However, it is also possible to permit setting of the displayed map range as desired according to the user's position. Furthermore, it is possible to permit selection of the road map scale according to the memory capacity or the like. For example, two or more different map scales may be prepared for coping with the memory capacity.

A second embodiment of the data terminal device according to the present invention will now be described with reference to FIGS. 10 to 12. Parts like those in the first embodiment of the data terminal device are not described.

In the second embodiment, instead of preliminarily storing road map data in a data terminal device as portable telephone set, it is adopted to receive road map data from load map server 16 via network 15.

Figure 10:
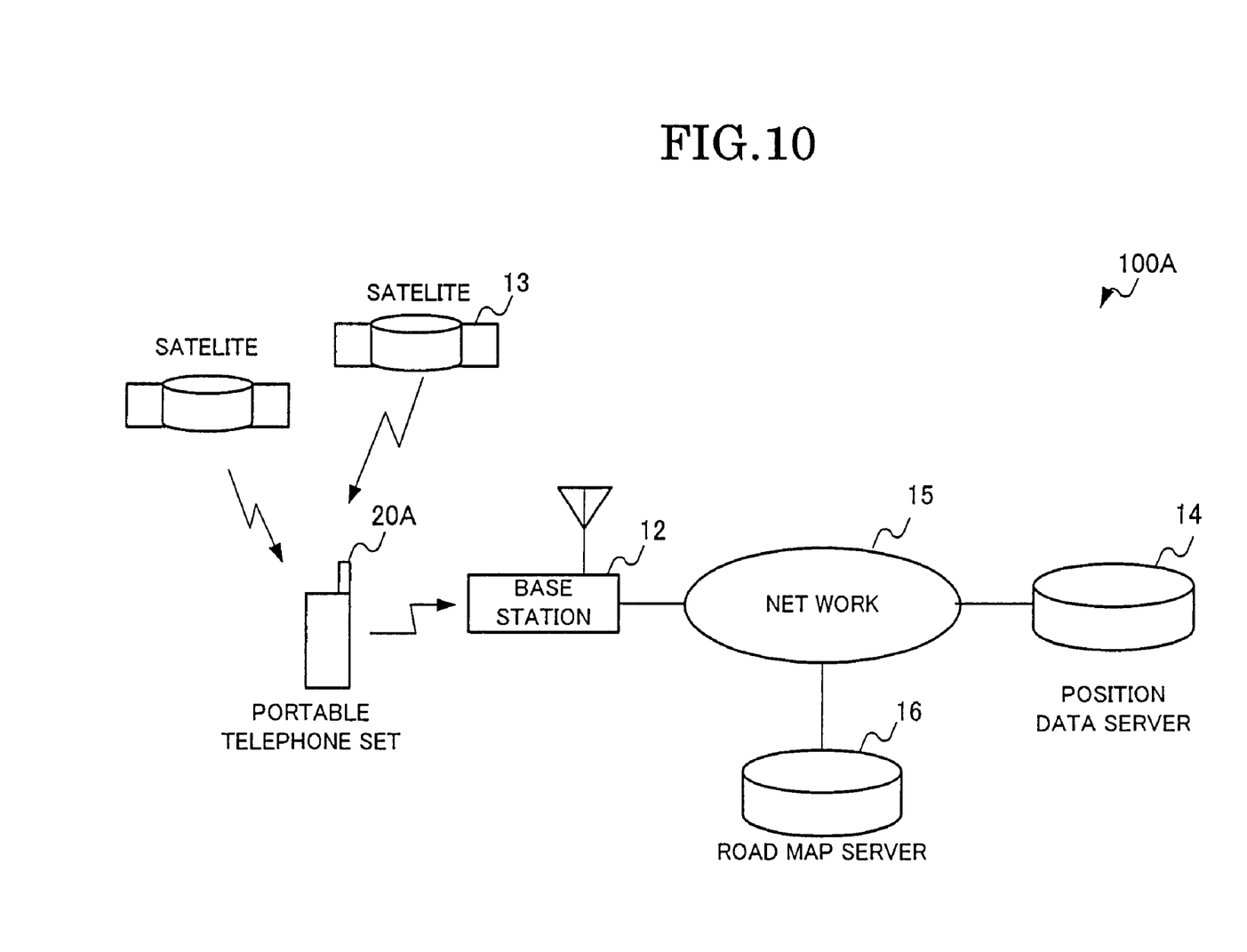
FIG. 10 shows a data network system using a second embodiment of the data terminal device according to the present invention.

FIG. 10 is a view showing a data network system adopting the second embodiment of the data terminal device. As shown in FIG. 10, the data network system 100A comprises a portable telephone set 20A as data terminal device, a base station 12 accessible from the portable telephone set 20A, an artificial satellite 13 for transmitting GPS radio waves, and a position data server 14, in which detailed map data including such map data for walking people as crossroads, walking road bridges and underground roads and also general building data are stored. As shown in FIG. 1, the base station 12 and the position data server 14 are interconnected via a network 15 (such as an internet system). A road map server 16 in which road map data are stored, is further connected to the network 15.

Figure 11:
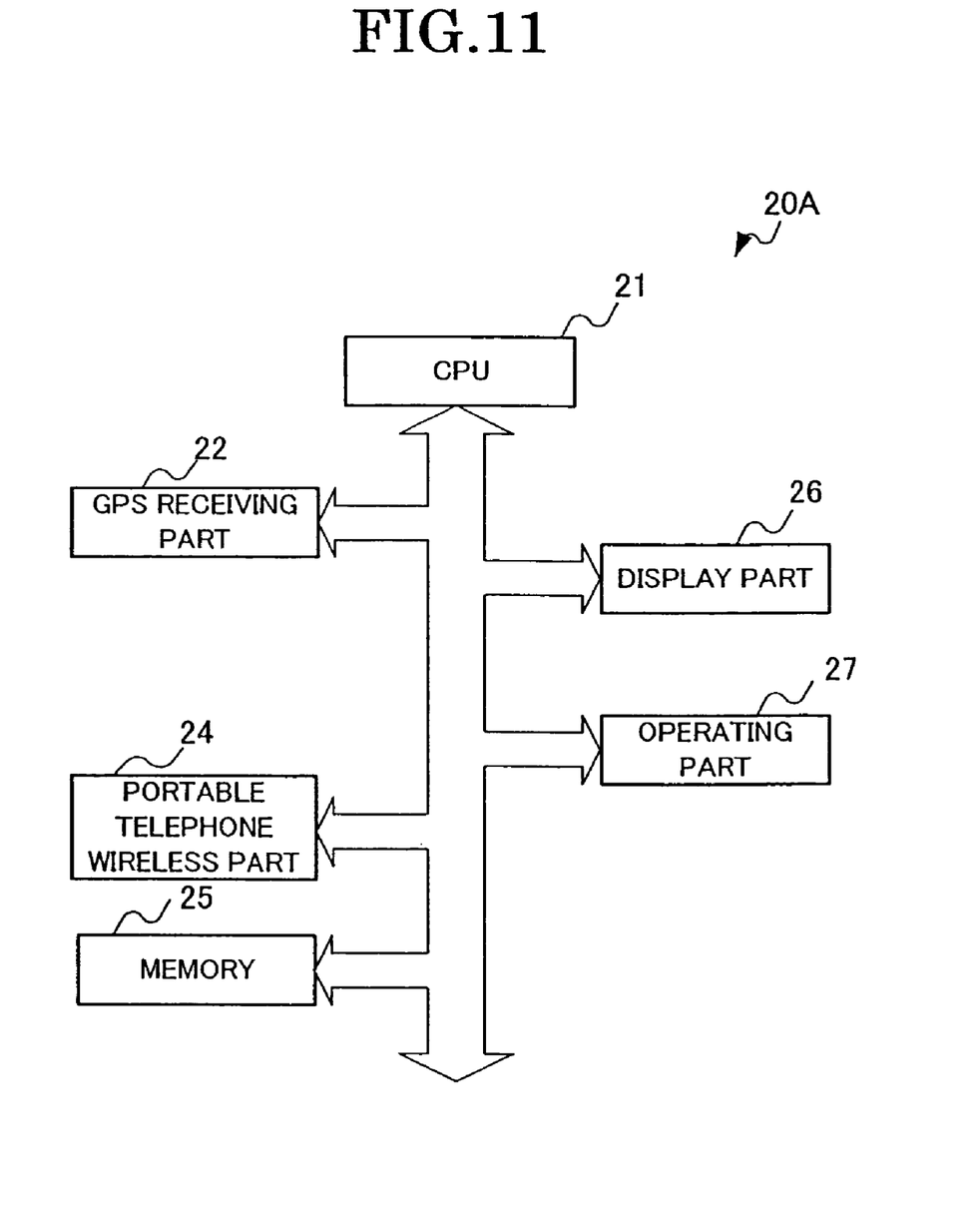
FIG. 11 is a block diagram showing the arrangement of the portable telephone set.

FIG. 11 is a block diagram showing the arrangement of the portable telephone set 20A. As shown in the Figure, the portable telephone set 20A does not include any part corresponding to the map data part 23 in the portable telephone set 20, while the other parts are like those in the portable telephone set 20.

Figure 12:
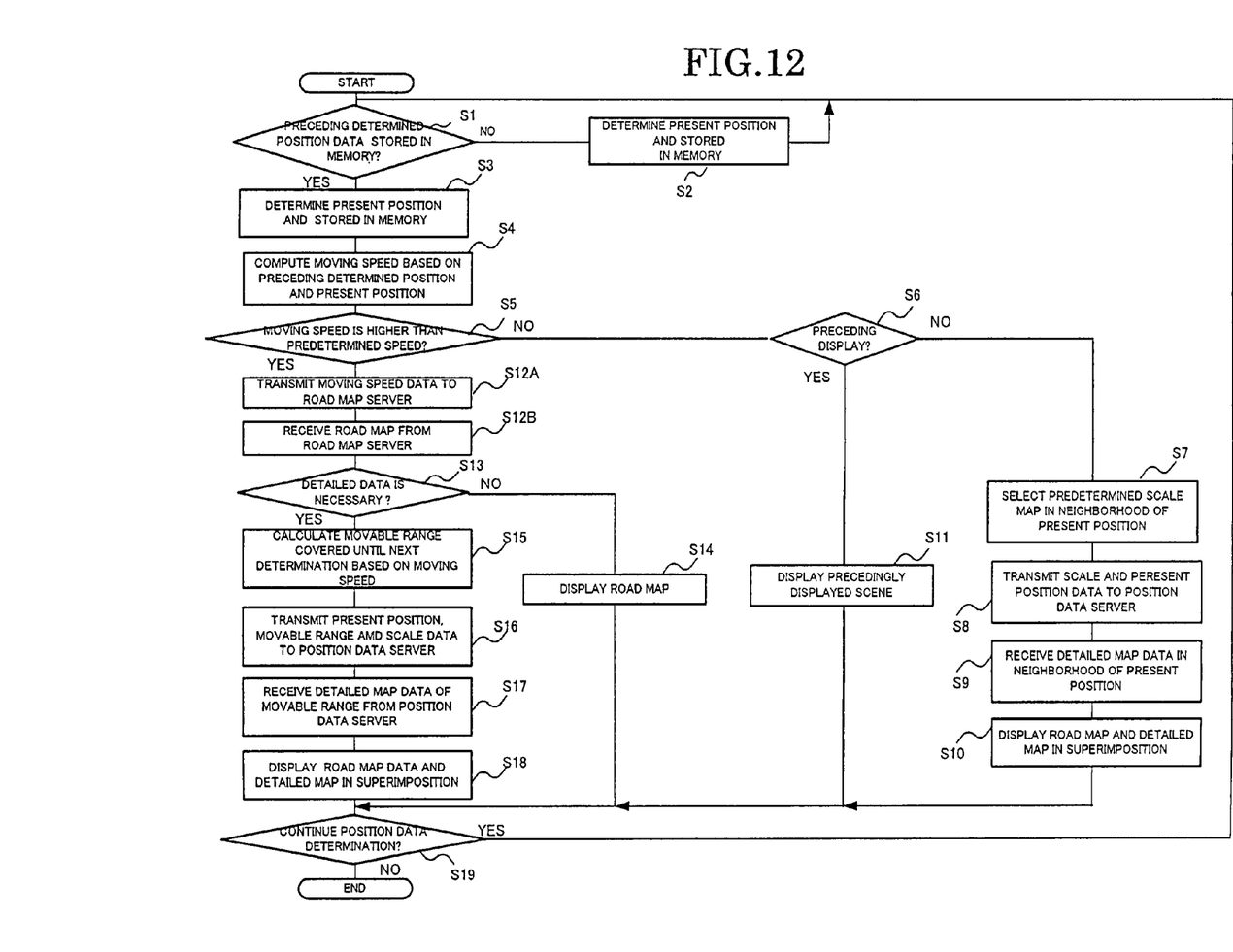
FIG. 12 is a flow chart illustrating the operation routine performed in the data terminal device.

FIG. 12 is a flow chart illustrating the operation routine performed in the data terminal device 20A. In the routine of the second embodiment, steps S12A and S12B are executed in lieu of the step S12 in FIG. 3. The other steps are like those in the first embodiment.

As shown in FIG. 12, when it is determined in the step S5 that the moving speed is higher than a predetermined speed, the step S12A is executed, in which the portable telephone wireless part 24 transmits a request for transmitting a road map of an adequate scale, among the road map data stored in the road map server 16, to the road map server 16 according to the moving speed computed in the step S4. In the next step S12B, the portable telephone wireless part 24 receives the road map data as transmitted from the road map server 15 in response to the request. In the second embodiment, the road map is displayed by using the road map data received from the road map server 16 (steps S14 and S18).

As shown above, in the second embodiment, with the road map data stored in the road map server 16 it is not necessary to store any large capacity memory for storing any road map data. Also, it is not necessary to make updating of any road map stored in the memory, and road map data can be managed absolutely on the side of the road map server 16.

A third embodiment of the data terminal device according to the present invention will be described with reference to FIGS. 13 to 15. Parts like those in the first embodiment of the data terminal device are not described.

In the third embodiment, not only the moving range capable of being covered but also the moving direction is taken into considerations, and the range of the displayed detailed map is limited to only the moving direction.

Figure 13:
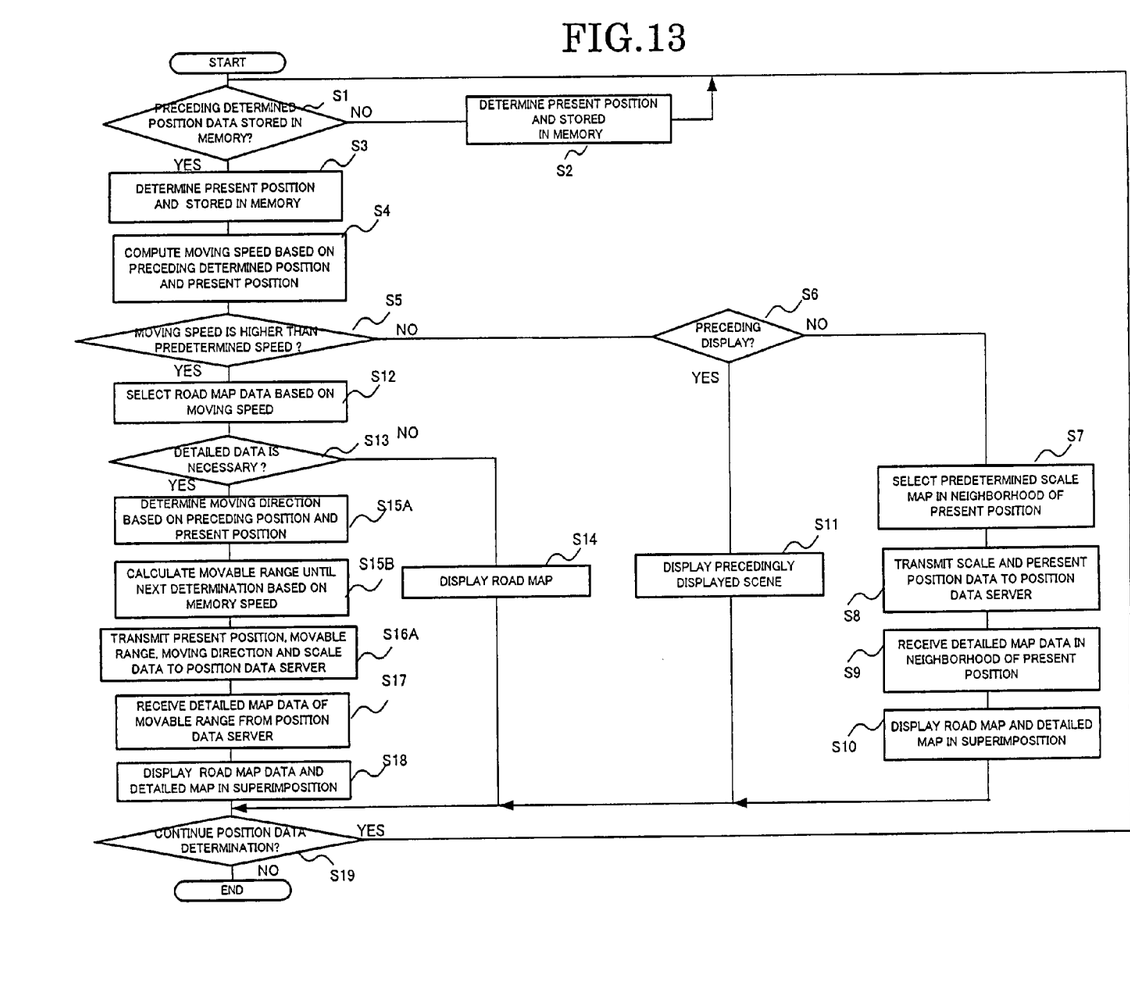
FIG. 13 is a flow chart illustrating the operation routine performed by the portable telephone set as the third embodiment of the data terminal device according to the present invention.

FIG. 13 is a flow chart illustrating the operation routine performed by the portable telephone set as the third embodiment of the data terminal device. In the routine in the third embodiment, steps S15A, S15B and S16A are executed in lieu of the steps S15 and S16 shown in FIG. 3. The other steps are like those in the first embodiment.

As shown in FIG. 13, when it is determined in the step S13 that display of a detailed map is necessary, the step S15A is executed, in which the moving direction is determined from the relation between the present position determined this time and the present position determined in the preceding determination. In the road map shown in FIG. 14, the direction of arrow directed from the position (A) determined in the preceding determination to the present position (B) determined this time is the moving direction. In the next step S15B, the moving distance that can be covered until the next present position determination is calculated. The calculation is made in the same way as in the step S15. In the next step S16A, data representing the present position, the moving range capable of being covered until the next determination, the moving direction and the scale of road map displayed on the display part 26 are transmitted. In the next step S17, the detailed map data transmitted from the position data server 14 is received.

Figure 15:
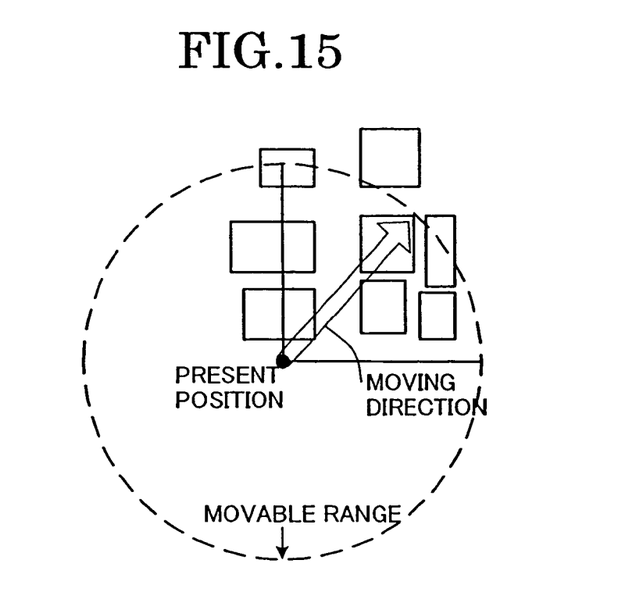
FIG. 15 shows detailed map.

The detailed map data is identical with the data transmitted in the step S16A and, as shown in FIG. 15, represents a detailed map in the movable range capable of being covered, which corresponds in scale to the road map. The data corresponds only to a range within a certain angle with respect to the moving direction from the present position, and does not contain the data concerning the side opposite the moving direction.

Figure 14:
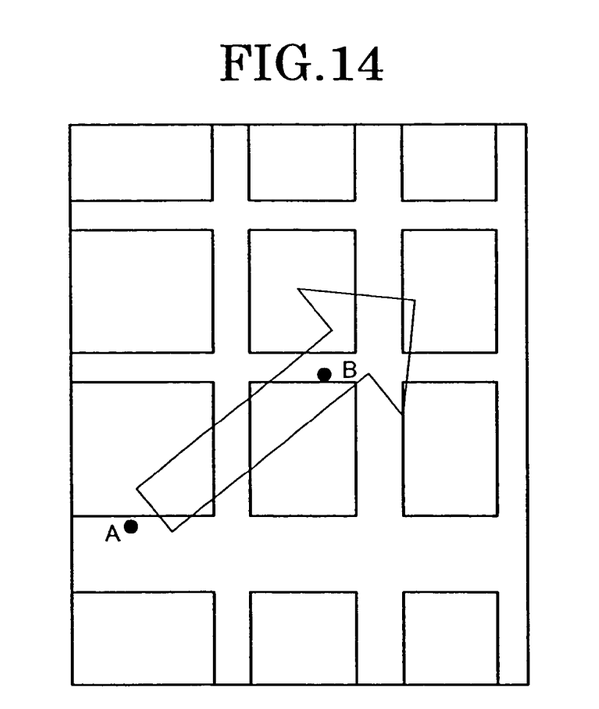
FIG. 14 shows moving direction.

In the step S18, the road map shown in FIG. 14 and the detailed map data shown in FIG. 15 are displayed in superimposition on each other.

As shown above, in the third embodiment, since the detailed map data transmitted from the position data server 14 is limited to only moving direction data, it is possible to further reduce the quantity of the received detailed map data compared to the first embodiment.

Like the previous second embodiment, it is also possible to store the road map data in the road map server instead of the data terminal device.

A fourth embodiment of the data terminal device according to the present invention will now be described with reference to FIGS. 16 to 17. Parts like those in the first embodiment of the data terminal device are not described.

In the fourth embodiment, a guide route up to a desired spot as set by the user is displayed.

Figure 16:
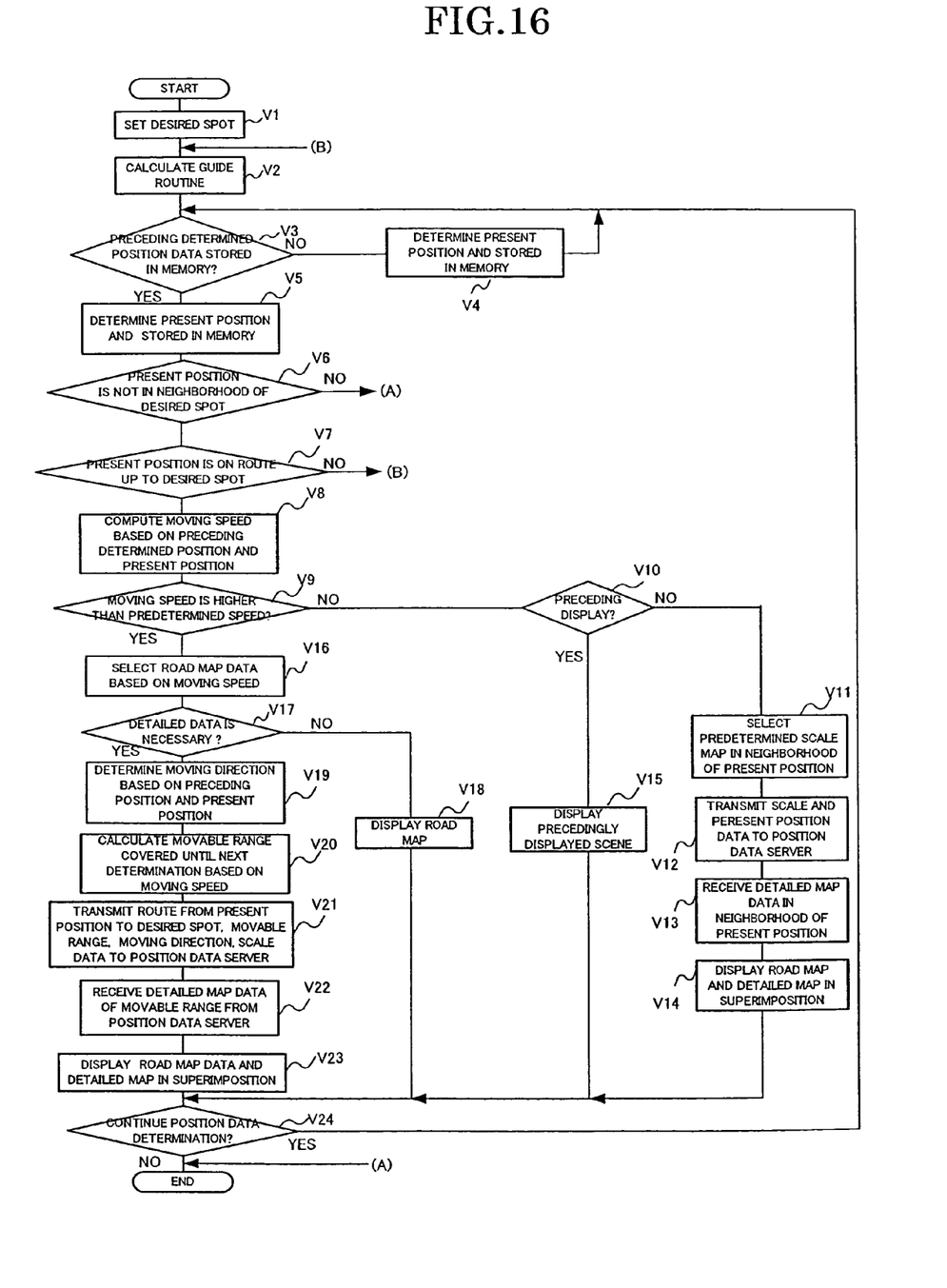
FIG. 16 is a flow chart showing the operation of portable telephone set as the fourth embodiment of the data terminal device according to the present invention.
Figure 17:
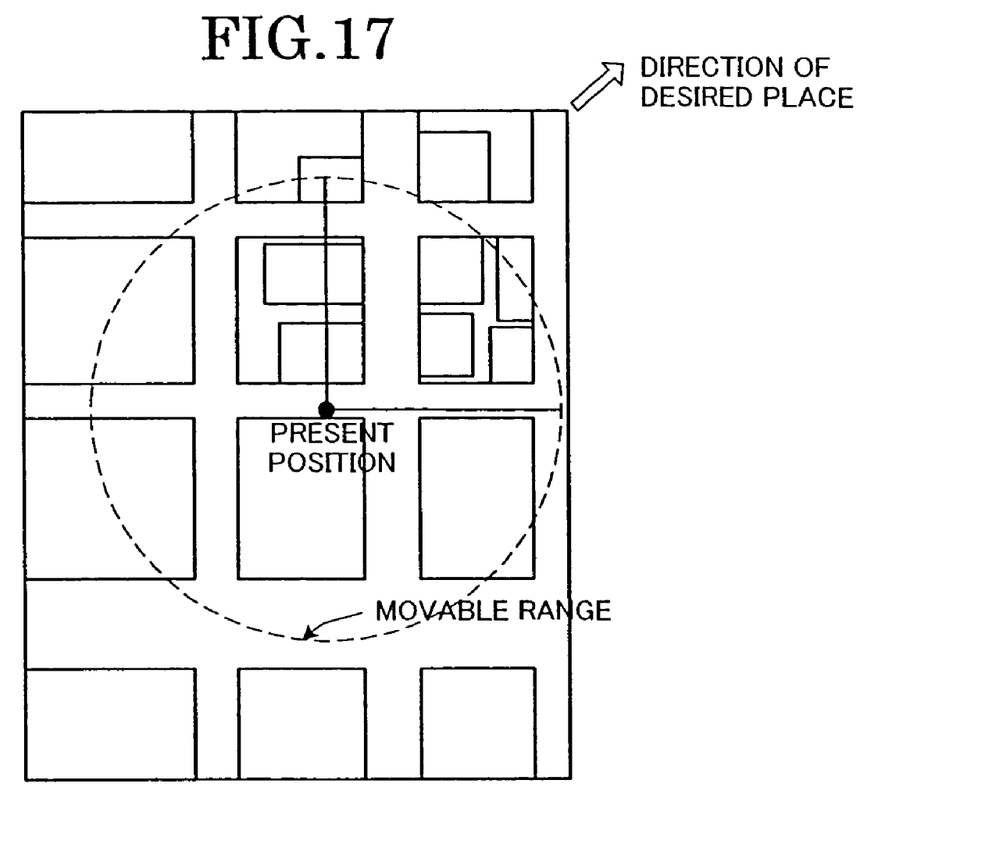
FIG. 17 is a view showing the map displayed on the display part.

FIG. 16 is a flow chart showing the operation of portable telephone set as the fourth embodiment of the data terminal device. This operation routine is executed under control of the CPU 21.

In the routine in FIG. 16, a road map is displayed on the display part 26, and the user is instructed to set a desired spot (Step V1). Then the guide route is calculated (Step V2).

In a step V3, a check is made as to whether position data in the preceding present position determination has been stored in the memory 25. When it is determined that no position data is present in the memory 25, the GPS receiving part 22 receives GPS radio waves from the artificial satellite 13 for present position determination, and stores the determined present position in the memory 25 (step V4). The routine then goes back to the step V3. When it is decided that position data is present in the memory 25, the GPS receiving part 22 receives GPS radio waves for present position determination, and stores the determined present position in the memory 25 (step V5). Then the routine goes to step V6. At this time, the position determined in the preceding determination and the present position determined this time are stored in the memory 25. It is possible as well to cause display of the present position in the display part 26 after execution of the step V5. The present position determination in the step V5 is executed in such a timing that the time interval with respect to the preceding determination is constant.

In step V6, a check is made as to whether the present position is in the neighborhood of the desired spot. When affirmation yields in this check, an end is brought to the routine. When negation yields, a check is made as to whether the present position is on the route up to the desired spot (step V7). When the present position is not on the route, the routine goes back to the step V2 for guide route calculation afresh. When the present position is on the route, the moving distance is calculated based on the preceding determined position stored in the memory 25 and the present position determined this time. Also, the moving speed (i.e., average moving speed) from the preceding determined position to the present position determined this time is computed based on the computed moving distance and the time interval from the preceding determined position to the position determined this time (step V8). Then, a check is made as to whether the computed moving speed is higher than a predetermined speed (step V9). The predetermined seed is set to one, which permits a check in the step V9 as to whether one substantial movement has been made from the position of the preceding detection till the present position of the present detection, for instance, it is set to about 1 km/h or below.

When it is determined in the step V9 that the moving speed is lower than the predetermined speed, that is, no substantial movement is detected, a check is made as to whether map display has been made at the preceding present position determination time (step V10). When negation yields in this check, the route goes to the step V11. When affirmation yields in this step, on the other hand, the routine goes to the step V15. In the step V11, a road map of a predetermined scale in the neighborhood of the present position is selected. Data representing that scale and the present position are transmitted to the position data server 14 (step V12). When the position data server 14 receives the data, it transmits corresponding detailed map data to the portable telephone set. Subsequently, detailed map data in the neighborhood of the present position transmitted from the position data server 14 is received and stored in the memory 25 (step V13), and the road map selected in the step V11 and the detailed map based on the detailed map data obtained in the step V13 are displayed in superimposition on each other on the display part 26 (step S14). The routine then goes to the step V24. As shown above, when affirmation yields in the step V10, the routine goes to the step V15, in which the map displayed at the preceding present position determination time is continuously displayed. The routine then goes to the step V24.

When it is determined in the step V9 that the moving speed is not lower than the predetermined speed, a map of an adequate scale among the map data stored in the map data part 23, is selected according to the moving speed computed in the step V8 (step V16). The user is then instructed to input the data as to whether the detailed map data is necessary. When it is decided on the basis of operation with respect to the operating part 27 that detailed map data has been requested, the routine goes to the step V19. When it is decided that no detailed map data is requested, the routine goes to the step V18 (step V17). As shown, the user can make a selection as to whether a detailed map is to be displayed.

When no detailed map data is necessary, only the detailed map selected in the step V16 is displayed on the display part 26 (step V18). The routine then goes to the step V24.

When a detailed map is necessary, the moving direction is determined based on the position determined in the preceding determination and the present position determined this time (step V19), and the distance capable of being covered until the next determination is calculated (step V20). The calculation is executed on the basis of the moving speed computed in the step V8. Since the present position determination interval (i.e., time interval) is constant, it is possible to calculate the distance or range capable of being covered from the computed moving speed. Subsequently, the position data server 14 transmits data representing the present position, the moving range capable of being covered until the next present position determination, the moving direction, and the scale of the road map displayed on the display part 26 (step V21). Then, detailed map data transmitted from the position data server 14 is received and stored in the memory 25 (step V22). The detailed map data is identical with the data that is transmitted in the step V20, and represents a detailed map in the moving range capable of being covered in the moving direction conforming to the scale of the road map. Then, as shown in FIG. 17, the road map selected in the step V16 is displayed in superimposition on the detailed map read out from the memory 25 on the display part 26 (step V23).

Subsequently, the user is instructed to input data as to whether the operation of obtaining the position data is to be continued. When it is decided according to the operation with respect to the operating part 27 that continuation has been requested, the routine goes back to the step V3. When it is desired that no continuation has been requested, the routine is ended (step V24). When the routine goes back to step V3, the next present position determination is executed by holding a predetermined determination interval (step V5).

As has been shown, in the fourth embodiment no detailed map data other than that in the neighborhood of the routine up to the desired spot is received, and it is thus possible to reduce the quantity of received data. Also, it is possible to provide a routine guide using detailed map data such as walking road bridges and crossroads, the routine guide being necessary for guiding a walking person. It is thus possible to provide an accurate guide for a walking person.

Changes in construction will occur to those skilled in the art and various apparently different modifications and embodiments may be made without departing from the scope of the present invention. The matter set forth in the foregoing description and accompanying drawings is offered byway of illustration only. It is therefore intended that the foregoing description be regarded as illustrative rather than limiting.

What is claimed is:

1. A data terminal device comprising:
   a position data receiving part for receiving position data transmitted from an artificial satellite;
   a wireless part for transmitting and receiving data with respect to a base station;
   a detailed map data memory part for storing detailed map data received by the wireless unit;
   a scale determining part for determining the scale of the road map according to a plurality of position data received a plurality of times by the position data receiving part; and
   a display part for displaying the road map of the scale determined by the scale determining part and detailed map data stored in the memory part; and
   a moving direction determining part for determining the moving direction based on the position data received a plurality of times by the wireless part; and in which the wireless part receives detailed map data only with respect to the moving direction determined by the moving direction determining part.

2. The data terminal device according to claim 1, which further comprises a road map storing part for storing the road map in a plurality of different scales, and in which the road map displayed on the display part is read out from the road map storing part.

3. The data terminal device according to claim 1, wherein road map data for displaying the road map is stored in the road map server connected to a network with the base station connected thereto, the wireless part receives, via the base station, the road map data stored in the road map server, and the road map is displayed based on the road map data received by the wireless part.

4. The data terminal device according to claim 1, wherein the scale determining part predicts a moving range capable of being covered in a predetermined time based on the position data received a plurality of times by the receiving part, the map scale being determined according to the predicted moving range capable of being covered.

5. The data terminal device according to claim 4, wherein the scale determining part computes the moving speed based on the position data received a plurality of times by the receiving part, the moving range capable of being covered being predicted according to the computed moving speed.

6. The data terminal device according to claim 5, wherein the scale determining part predicts, as the movable range capable of being covered, a range which can be covered up to next acquisition of position data or determination based on the obtained position data, by using the computed moving speed.

7. The data terminal device according to claim 4, wherein the wireless part receives only detailed map data of a necessary area based on the movable range capable of being covered as predicted by the scale determining part.

8. The data terminal device according to claim 1, wherein the map of the scale determined by the scale determining part and the detailed map data stored in the memory part are displayed in superimposition on the each other on the display part.

9. A data terminal device comprising:
   a position data receiving part for receiving position data transmitted from an artificial satellite;
   a wireless part for transmitting and receiving data with respect to a base station;
   a detailed map data memory part for storing detailed map data received by the wireless unit;
   a scale determining part for determining the scale of the road map according to a plurality of position data received a plurality of times by the position data receiving part; and
   a display part for displaying the road map of the scale determined by the scale determining part and detailed map data stored in the memory part; and
   a route determining part for executing route guide display by determining the route from the present position to a desired spot; and in which the wireless part receives detailed map data only in the moving direction of the route determined by the route determining part.

10. The data terminal device according to claim 1, wherein the detailed map data are stored in a detailed map data server connected to a network with the base station connected thereto; and the wireless part receives, via the base station, detailed map data stored in the detailed map data server.

11. The data terminal device according to claim 9, which further comprises a road map storing part for storing the road map in a plurality of different scales, and in which the road map displayed on the display part is read out from the road map storing part.

12. The data terminal device according to claim 9, wherein road map data for displaying the road map is stored in the road map server connected to a network with the base station connected thereto, the wireless part receives, via the base station, the road map data stored in the road map server, and the road map is displayed based on the road map data received by the wireless part.

13. The data terminal device according to claim 9, wherein the scale determining part predicts a moving range capable of being covered in a predetermined time based on the position data received a plurality of times by the receiving part, the map scale being determined according to the predicted moving range capable of being covered.

14. The data terminal device according to claim 13, wherein the scale determining part computes the moving speed based on the position data received a plurality of times by the receiving part, the moving range capable of being covered being predicted according to the computed moving speed.

15. The data terminal device according to claim 14, wherein the scale determining part predicts, as the movable range capable of being covered, a range which can be covered up to next acquisition of position data or determination based on the obtained position data, by using the computed moving speed.

16. The data terminal device according to claim 13, wherein the wireless part receives only detailed map data of a necessary area based on the movable range capable of being covered as predicted by the scale determining part.

17. The data terminal device according to claim 9, wherein the map of the scale determined by the scale determining part and the detailed map data stored in the memory part are displayed in superimposition on the each other on the display part.

18. The data terminal device according to claim 9, wherein the detailed map data are stored in a detailed map data server connected to a network with the base station connected thereto; and the wireless part receives, via the base station, detailed map data stored in the detailed map data server.

* * * * *